United States Patent
Walter

(10) Patent No.: US 9,903,110 B2
(45) Date of Patent: Feb. 27, 2018

(54) DEVICE FOR CONFIGURING DEFORMABLE MATERIAL TO PROVIDE A PREDETERMINED RELATIVELY NON-DEFORMABLE VISUAL DISPLAY

(71) Applicant: Gregory Walter, Minooka, IL (US)

(72) Inventor: Gregory Walter, Minooka, IL (US)

( * ) Notice: Subject to any disclaimer, the term of this patent is extended or adjusted under 35 U.S.C. 154(b) by 362 days.

(21) Appl. No.: 14/546,000

(22) Filed: Jul. 16, 2015

(65) Prior Publication Data

US 2016/0089833 A1    Mar. 31, 2016

Related U.S. Application Data

(60) Provisional application No. 61/999,100, filed on Jul. 16, 2014.

(51) Int. Cl.
| | |
|---|---|
| *E04B 1/00* | (2006.01) |
| *E04B 2/16* | (2006.01) |
| *E04B 2/02* | (2006.01) |
| *B28B 7/00* | (2006.01) |
| *B28B 1/14* | (2006.01) |
| *B29C 33/42* | (2006.01) |
| *B28B 7/02* | (2006.01) |

(52) U.S. Cl.
CPC ........ *E04B 2/16* (2013.01); *B28B 1/14* (2013.01); *B28B 7/007* (2013.01); *B28B 7/02* (2013.01); *B28B 7/025* (2013.01); *B29C 33/424* (2013.01); *E04B 2002/0265* (2013.01); *E04B 2002/0267* (2013.01); *E04B 2103/02* (2013.01)

(58) Field of Classification Search
CPC .... E04B 2/16; E04B 2103/00–2103/06; E04B 2002/0265; E04B 2002/0267; E04B 2002/0269; E04B 2002/0271; B28B 1/14; B28B 7/02; B28B 7/025; B28B 7/04; B28B 7/06; B28B 7/007; B29C 33/424

USPC .......................................................... 156/63
See application file for complete search history.

(56) References Cited

U.S. PATENT DOCUMENTS

| | | | | |
|---|---|---|---|---|
| 4,826,639 A | * | 5/1989 | Vidal | B28B 7/025 |
| | | | | 249/11 |
| 8,919,726 B2 | * | 12/2014 | Hendricks | E04G 11/062 |
| | | | | 249/192 |

* cited by examiner

*Primary Examiner* — Carson Gross
(74) *Attorney, Agent, or Firm* — Donald Flaynik

(57) ABSTRACT

A device for configuring deformable material to provide a predetermined relatively non-deformable visual display includes a plurality of configuration blocks for receiving deformable material that ultimately transforms to a relatively non-deformable material, and a key member for aligning and securing together adjacently disposed configuration blocks. Each of the configuration blocks include a plurality of gaps for arcuately disposing the configuration blocks; and an insert member that engages a ridge portion of each configuration block to ultimately configure an edge portion of the deformable material. A base portion of each configuration block ultimately receives deformable material thereupon that is configured to a predetermined design. Arm members of each configuration block and the insert member are manually removed, after the deformable material transforms to a relatively non-deformable material, to expose a predetermined design in the edge portion and the base portion of each configuration block. The combined displays in the edge portions and the base portions of the configuration blocks provide a predetermined relatively non-deformable visual display.

44 Claims, 20 Drawing Sheets

DEVICE FOR CONFIGURING DEFORMABLE MATERIAL TO PROVIDE A PREDETERMINED RELATIVELY NON-DEFORMABLE VISUAL DISPLAY

This Utility application is based on Provisional Application No. 61/999,100, filed on Jul. 16, 2014.

BACKGROUND OF THE INVENTION

1. Field of the Invention

This invention relates to a device for configuring predetermined objects, and more particularly, to a flexible building block that can be configured to cooperate with adjacent flexible building blocks to form a structure that receives a deformable material such as concrete thereupon to form a predetermined visual display that ultimately transforms into a non-deformable visual display for viewing indoors or outside and exposed to the elements.

2. Background of the Prior Art

Decorative sculptures or visual depictions for indoor and outdoor displays are common for both private and commercial locations. Prior art displays are fabricated by using a solid device or "core" upon which a preselected display is ultimately constructed from a deformable material. Alternatively, rigid forms are used that are constructed of wood or similar non-flexible material, which form a foundation for a predetermined display.

The disadvantages of the prior art devices for constructing indoor or outdoor displays is that they are relatively expensive and heavy; they are non-flexible; they must be torn down and rebuilt when the display configuration is changed; and they require a myriad of workers possessing different skills (carpenters, cement masons, iron workers, etc.) to construct the foundation upon which the display is formed.

A need exists for a light-weight, easily assembled device that ultimately forms a foundation upon which a deformable material is applied to ultimately form a non-deformable predetermined display. Further, in the event that the intended configuration for the display is changed, a need exists for a device that is quickly and inexpensively modified to form a re-configured foundation that corresponds to the re-designed display. A device that can be quickly and inexpensively modified would promote a re-configured foundation that would receive the deformable material thereupon and form a re-designed display after transforming into a relatively non-deformable material, thereby achieving the re-design of the display with a minimal cost increase.

SUMMARY OF THE INVENTION

It is an object of the present invention to overcome many of the disadvantages associated with prior art devices for configuring deformable materials. A principal object of the present invention is to provide a relatively inexpensive device for configuring deformable material into a predetermined relatively non-deformable visual display. A feature of the device is that a relatively light-weight, inexpensive material such as Styrofoam, plastics, rubber and the like is used to fabricate a building block. An advantage of the building block is that it can be manually carried and positioned to form a predetermined configuration.

Another object of the present invention is to provide a building block that is sufficiently flexible to be manually bent to cooperate with other building blocks to form a foundation that receives a deformable material to construct a visual display. A feature of the block is a plurality of apertures in portions of the building block that enable the block to be arcuately configured. An advantage of the block is that the block is bendable over a relatively broad range to achieve a predetermined configuration. Another advantage of the block is that the block maintains its configuration after being bent to the required position, thereby allowing a deformable material to be applied to the surface of the device and allow the deformable material to transform into a relatively non-deformable predetermined display.

Another object of the present invention is to provide a building block that maintains the deformable material upon a surface portion of the block. A feature of the block is a ridge portion that extends above a top wall of the block to an elevation sufficient to maintain a predetermined thickness of deformable material upon the top wall. Another feature of the block is a plurality of aperture plugs that fill selected apertures after the block has been bent or otherwise configured, and before the deformable material has been applied to the top wall of the block. An advantage of the block is that the deformable material is maintained upon the top wall of the block instead of escaping through apertures or flowing down side walls of the block.

Yet another object of the present invention is to provide a building block that longitudinally joins to an adjacent block. A feature of the block is a key member that is manually inserted into cooperating apertures in the adjacent blocks. An advantage of the block is that the key member rigidly joins adjacent blocks together and prevents a deformable material from "leaking" from a top wall of the adjacently disposed building blocks.

Still anther object of the present invention is to provide aperture plugs that correspond to building block aperture configurations after a respective block has been "bent" to a required form. A feature of the block is to plug apertures extending downward from a top wall of the block before a deformable material is applied to the top wall. An advantage of the block is that having aperture plugs that include multiple configurations minimizes the "opening" of the aperture in the top wall such that the deformable material is maintained upon the top wall of the block irrespective of the degree of bend of the block to form the predetermined display.

Briefly, the invention provides a device for configuring deformable material to provide a predetermined relatively non-deformable visual display comprising:

a plurality of configuration blocks for receiving deformable material that ultimately transforms to a relatively non-deformable material;

means for aligning and securing together adjacently disposed configuration blocks;

means for arcuately disposing said configuration blocks;

means for configuring an edge portion of said deformable material;

means for removing first predetermined portions of said configuration blocks; and means for vertically securing said deformable material to second predetermined portions of said configuration blocks, whereupon, predetermined designs are permanently imprinted upon said first and second predetermine portions, resulting in a relatively rigid predetermined visual display.

The invention further provides a device for configuring visual displays comprising:

a plurality of configuration blocks for receiving deformable material that ultimately transforms to a relatively non-deformable material;

means for securing together adjacently disposed configuration blocks;

means for configuring an edge portion of said deformable material; and means for removing predetermined portions of said configuration blocks, whereupon, predetermined designs are permanently imprinted upon visible portions of said configuration blocks, resulting in a relatively rigid predetermined visual display.

The invention also provides a method for configuring deformable material that ultimately transforms to a relatively non-deformable material having a predetermined design, said method comprising the steps of:

providing a plurality of configuration blocks for receiving deformable material that ultimately transforms to a relatively non-deformable material;

aligning and securing together adjacently disposed configuration blocks;

disposing said configuration blocks in a non-linear configuration;

disposing a deformable material upon predetermined portions of said configuration blocks;

configuring said deformable material such that predetermined designs are permanently imprinted upon said deformable material; and removing predetermined portions of said configuration blocks after said deformable material has transformed into a relatively non-deformable material, whereby a relatively rigid predetermined visual display is provided.

BRIEF DESCRIPTION OF THE DRAWINGS

The foregoing invention and its advantages may be readily appreciated from the following detailed description of the preferred embodiment, when read in conjunction with the accompanying drawings in which.

DESCRIPTION OF THE PREFERRED EMBODIMENT

Referring to FIGS. 1-7, a device building block for configuring deformable material to provide a predetermined relatively non-deformable visual display in accordance with the present invention is denoted by numeral 10. The device 10 enables a person to construct a myriad of configurations that ultimately receive and support materials to fabricate artistic displays, signs, and irregular shaped objects having functional and/or artistic purpose.

Figure 4:
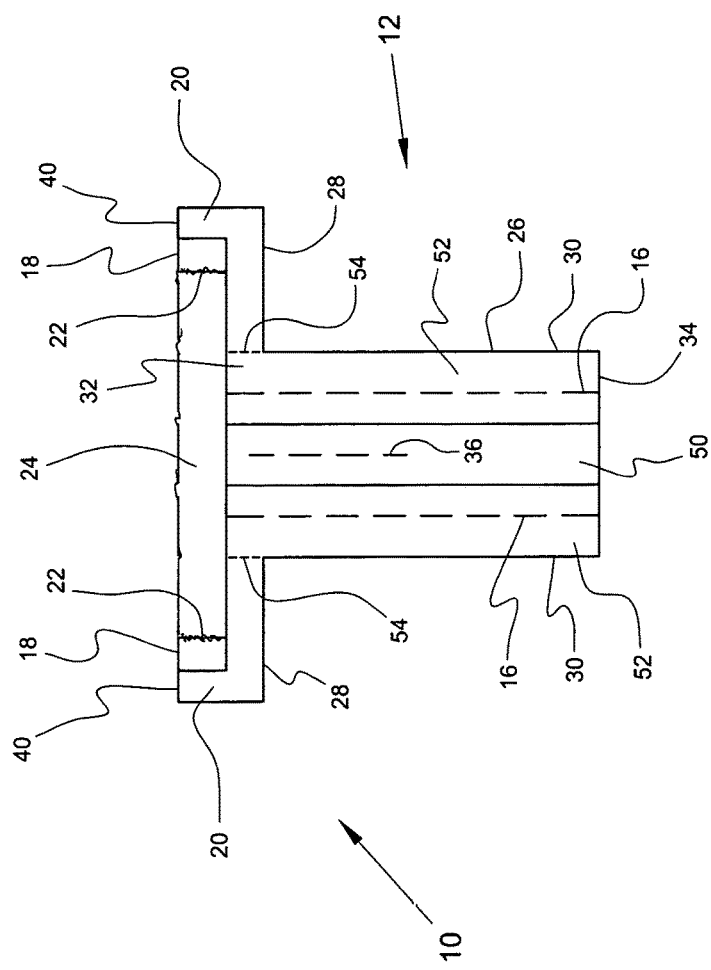
FIG. 4 is an end elevation phantom view of the building block of FIG. 1 with a deformable material disposed thereupon.

The device 10 includes a plurality of building or configuration blocks 12 for receiving deformable material that ultimately transforms to a relatively non-deformable material, and a key member 14 for aligning and securing together adjacently disposed configuration blocks 12. Each of the configuration blocks 12 include a plurality of gaps 16 for arcuately disposing the configuration blocks 12; and an insert member 18 that engages a ridge portion 20 of each configuration block 12 to ultimately configure an edge portion 22 of the deformable material 24 (FIG. 4). A base portion 26 of each configuration block 12 ultimately receives deformable material 24 thereupon that is configured to a predetermined design. Arm members 28 of each configuration block 12 and the insert member 18 are manually removed, after the deformable material 24 transforms to a relatively non-deformable material, to expose a predetermined design in the edge portion 22 of the now relatively non-deformable material 24. The combined displays in the edge portions 22 and the base portions 26 of the configuration blocks 12 provide a predetermined relatively non-deformable visual display.

The configuration blocks 12 can be fabricated from a myriad of materials including but not limited to Polystyrene, Polyurethane, plastics, metal, stone, concrete, plaster, grout, graphite and combinations thereof, so long as the material is capable of maintaining a predetermined configuration, irrespective of the weight of the deformable material 24 being supported by the configuration blocks 12. The deformable material 24 includes but is not limited to concrete, plaster, metal, baking goods and grout. The configuration blocks 12 have a relatively "T" configuration and include a plurality of gaps 16 extending into opposing side walls 30 of the blocks 12.

The gaps 16 extend from a top wall 32 of the configuration block 12 to a bottom wall 34 of the block 12. Further, the gaps 16 extend from the side wall 30 of the configuration block 12 to a position past a longitudinal mid-line 36 of the block 12, resulting in the cooperation between adjacent gaps 16 that extend from opposing side walls 30 to form configuration fingers 38 that provide more flexibility to the block 12 to allow the block 12 to arc or otherwise bend to a predetermined position. The gaps 16 and corresponding fingers 38 are rectangularly configured when taking a top elevation view of the configuration block 12. Alternatively, the configuration fingers 38 can have trapezoidal or triangle configurations when taking a top elevation view of the block 12. The trapezoid and triangle finger 38 configurations would orientated such that the gaps 16 would have a larger space at the side walls 30 of the block 12, and less space at the mid-line 36 at the block 12, thereby allowing the block to be bent to a smaller radius of arc while increasing the relative size and strength of the configuration fingers 38 such that the configuration blocks 12 do not "snap" or otherwise break apart. Irrespective of the gap 16 and finger 38 configurations, the preferred dimension of the gaps 16 at the side walls 30 of the configuration blocks 12 range between one-half and two inches with a preferred dimension of substantially about one inch when the longitudinal dimension of the block 12 side walls 30 is substantially about forty-eight inches; the dimension separating the side walls 30 is between eight and ten inches; and the height of the block 12 from a bottom wall 34 to a top wall 40 of the ridge portion 20 is substantially about twenty inches. Ultimately, the dimensions of the blocks 12 will vary depending upon the predetermined use of the blocks, but the block 12 dimensions and corresponding gaps 16 for the intended use of the block 12, will be proportionate to the preferred dimensions of the block 12 and gaps 16 described above.

Figure 6:
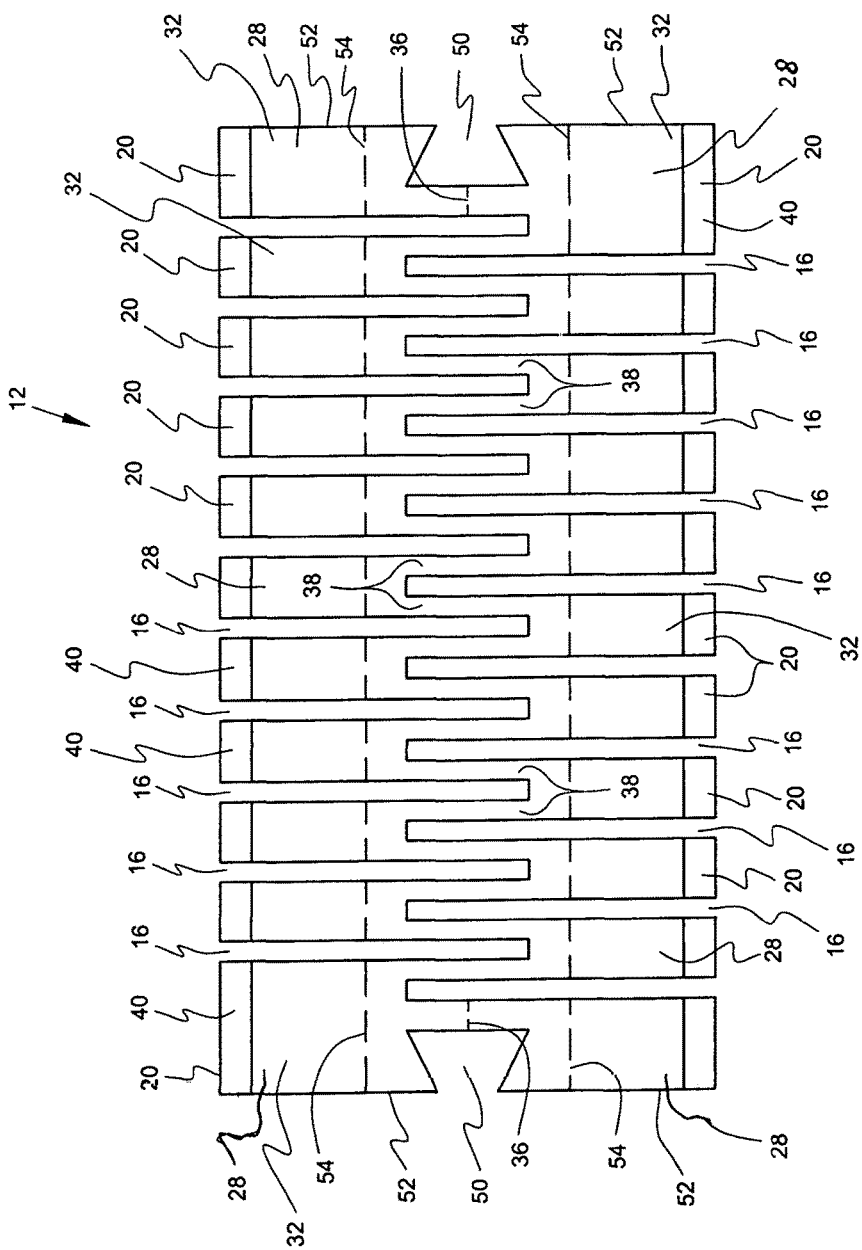
FIG. 6 is a front elevation view of the building block of FIG. 2 after rotating the block ninety degrees to display the top wall of FIG. 2 as the front wall of FIG. 6 in a substantially vertical plane in accordance with the present invention.

Referring now to FIG. 6, a front elevation view of the device 10 is depicted with the top wall 32 vertically illustrated, thereby "rotating" the block 12 ninety degrees. The revised orientation of the block 12 is provided to illustrate how the device 10 can be used to configure the deformable material 24 in a vertical plane instead of the horizontal plane described above. Further, the top walls 32 of the configuration blocks 12 can range from horizontal to vertical, and at any angle between horizontal and vertical. An example of use for the device 10, when the deformable material 24 would be vertically disposed; would include the base portion 26 being inserted into a hillside or vertical wall, such that the top wall 32 (now vertically disposed) of a plurality of blocks 12 would be cooperatively coupled to form a sign that includes arcuate letters such as "O" or "Q." Similar to the gap 16 configurations of the horizontal orientated top wall 32, the gaps 16 of the vertically orientated top wall 32 (see FIG. 6) would include the rectangular, trapezoid and triangle configurations described above.

Figure 5:
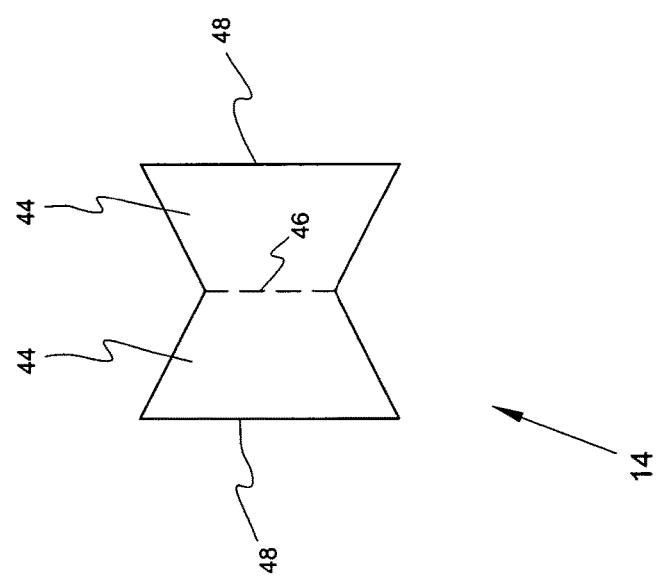
FIG. 5 is a top elevation view of key member in accordance with the present invention.
Figure 7:
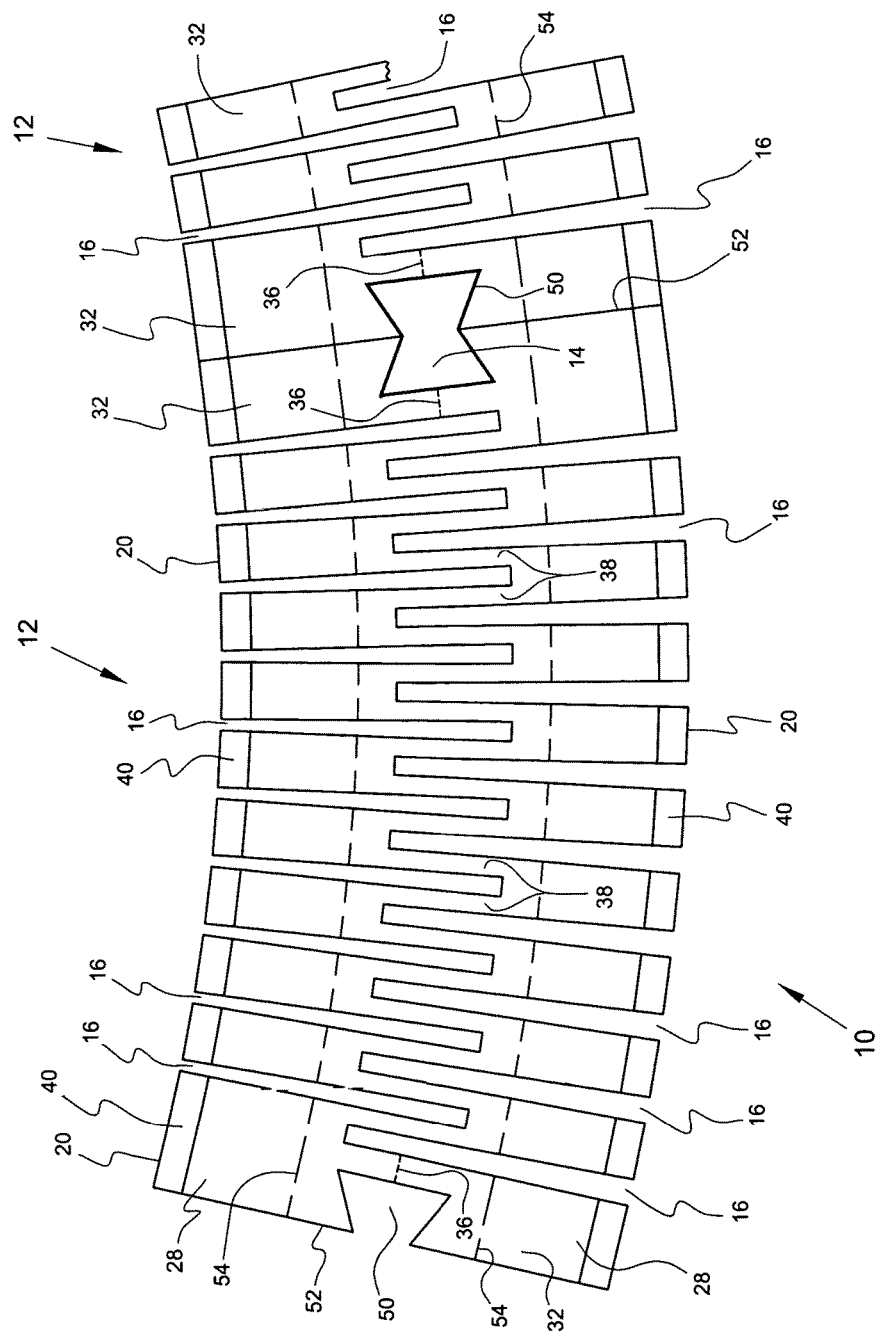
FIG. 7 is the top elevation view of the building block of FIG. 2, but with a top elevation view of a second building block secured to the building block of FIG. 2 with both blocks disposed in an arcuate or bent configuration in accordance with the present invention.

Referring to FIGS. 5 and 7, the configuration blocks 12 are aligned and secured together via securing key members 14 having "bow tie" configurations, when taking a top elevation view of the device. The key members 14 include two trapezoidal members 44 integrally joined via relatively shorter leg portions 46, such that relatively longer and parallel leg portions 48 are oppositely disposed to promote the snug engagement of the securing key member 42 with cooperatively configured recesses 50 in adjacently disposed configuration blocks 12. The key members 14 maintain congruent engagement between corresponding ends walls 52 of adjacently disposed configuration blocks 12, while the gaps 16 allow the adjacently disposed configuration blocks 12 to be linearly and/or arcuately disposed to achieve a predetermined configuration for a plurality of configuration blocks 12 that ultimately form a predetermined relatively non-deformable visual display that includes artistic and/or functional features.

Each of the arm members 28 of each configuration block 12 include perforations 54 that promote the manual removal of the arm members 28 from the base portion 26, thereby allowing the insert member 18 to be removed to expose the edge portion 22 of the deformable material 24 after the material has hardened or otherwise transformed to a relatively non-deformable material. Besides exposing the edge portion 22 after "breaking-off" the arm members 28, the now relatively non-deformable material 24 is sufficiently rigid to allow the material 24 to extend beyond the periphery of the side walls 30 of the base portion 26 to focus the attention of a person on the top of the material 24, which includes stamping designs manually impressed upon the material 24 while in a deformable state.

The gaps 16 between the arm members 28 are prevented from receiving the deformable material 24 via tape, mesh or similar means to prevent the material 24 from "leaking" through the arm members 28 and forming "streamers" of relatively hard materials from the arm members 28 to the ground surface. Alternatively, the gaps 16 in the base portion 26 of the block 12 are allowed to receive the deformable material 24, thereby strengthening the base portion 26 to support the deformable material 24 disposed upon the top wall 32 and the surface of the base portion 26. Although if the gaps 16 in the base portion 26 are not to receive any material 24, tape or a wire mesh could be used, or a material 24 with a relatively high viscosity. The deformable material 24 is ultimately secured to the surface of the base portion 26 via wire mesh or by increasing the viscosity of the material 24 to a degree that maintains the deformable material 24 upon the base portion 26, irrespective of the surface of the base portion 26 being vertically orientated. While the material 24 on the surface of the base portion 26 is in a deformable state, predetermined stamping designs are manually impressed upon the material 24. After the material 24 becomes non-deformable, the combined stamping designs on the top and side walls of the base portion 26 provide an artistic visual display upon a predetermined configuration having functional features required by an individual.

Figure 8:
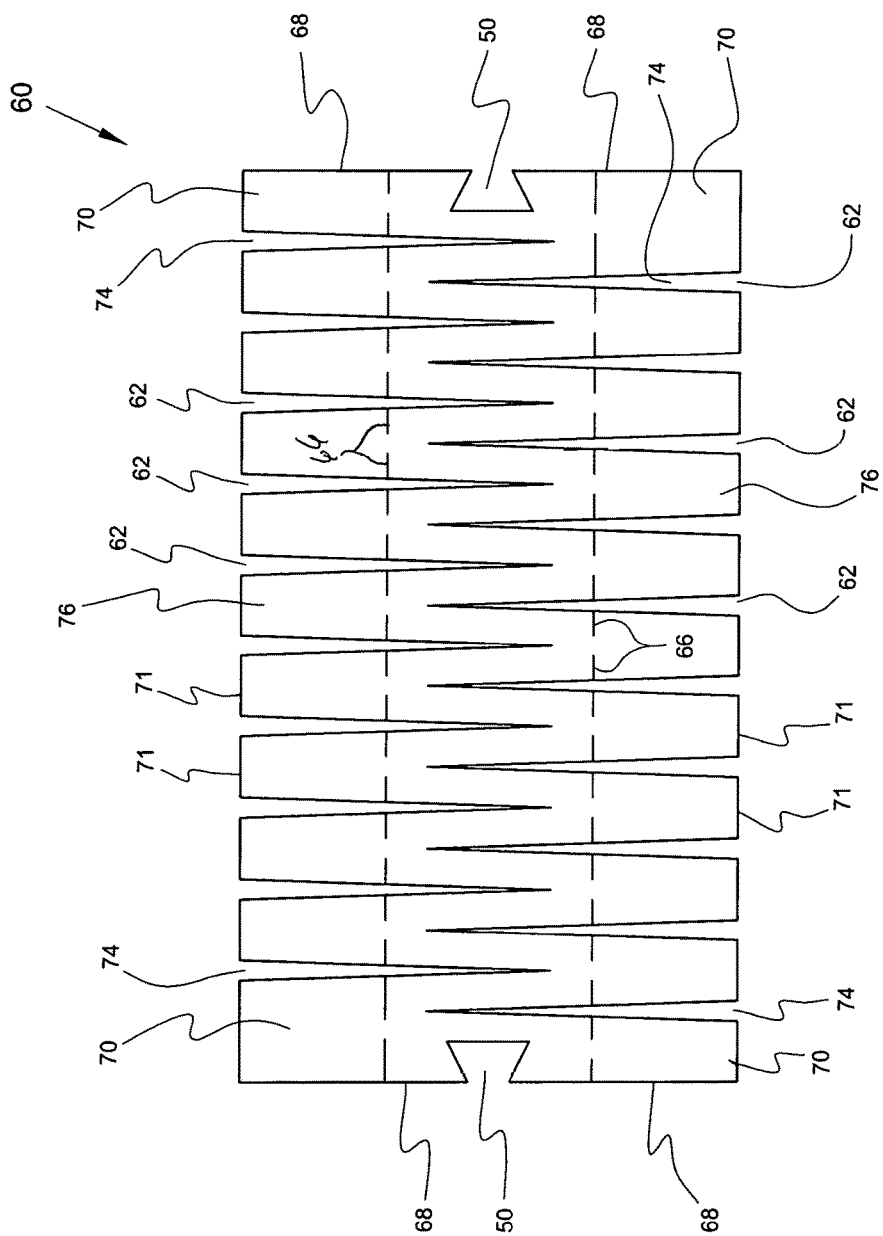
FIG. 8 is a top elevation view of the building block of FIG. 2 but without a ridge portion and with the gaps or apertures having a triangular instead of a rectangular configuration in accordance with the present invention.
Figure 8A:
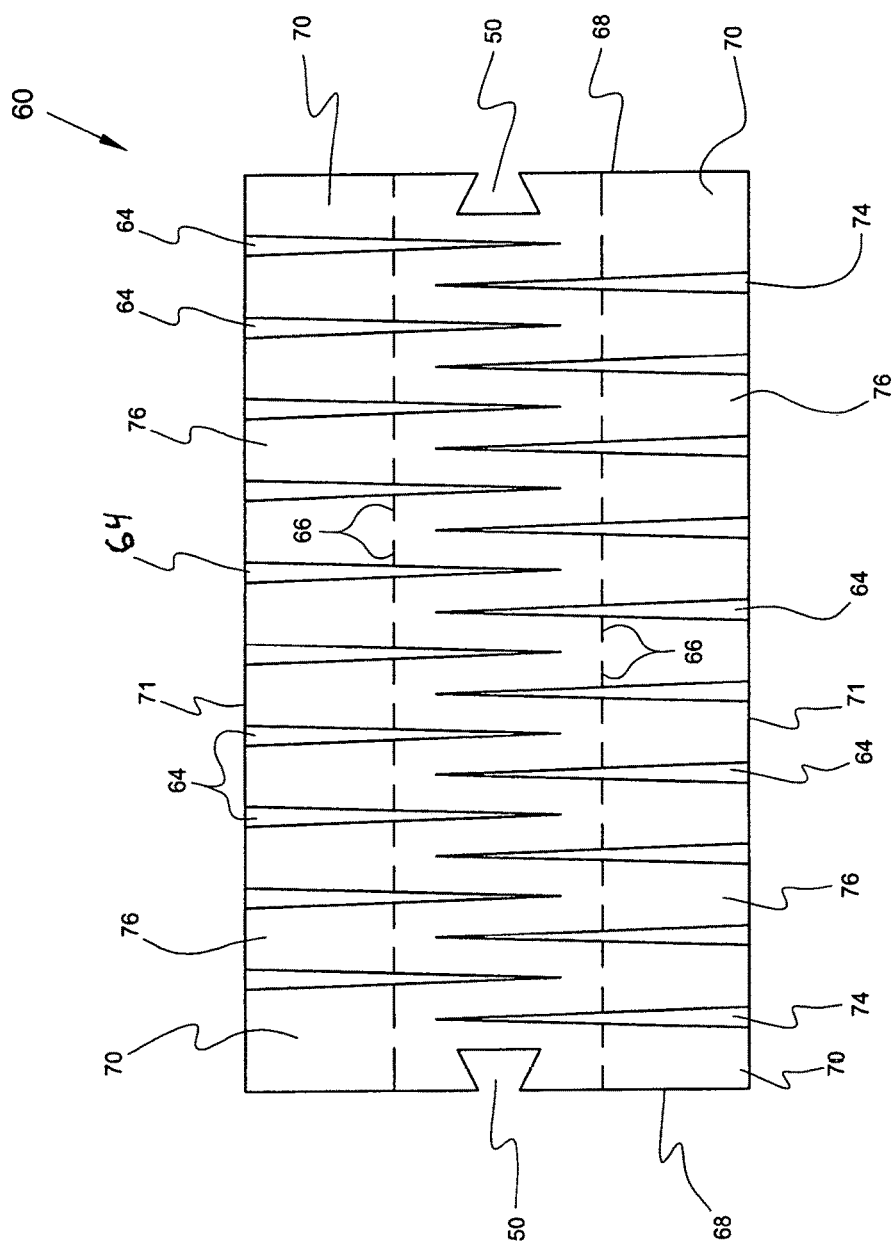
FIG. 8A is the top elevation view of FIG. 8, but with an aperture plug disposed in each aperture in accordance with the present invention.
Figure 9:
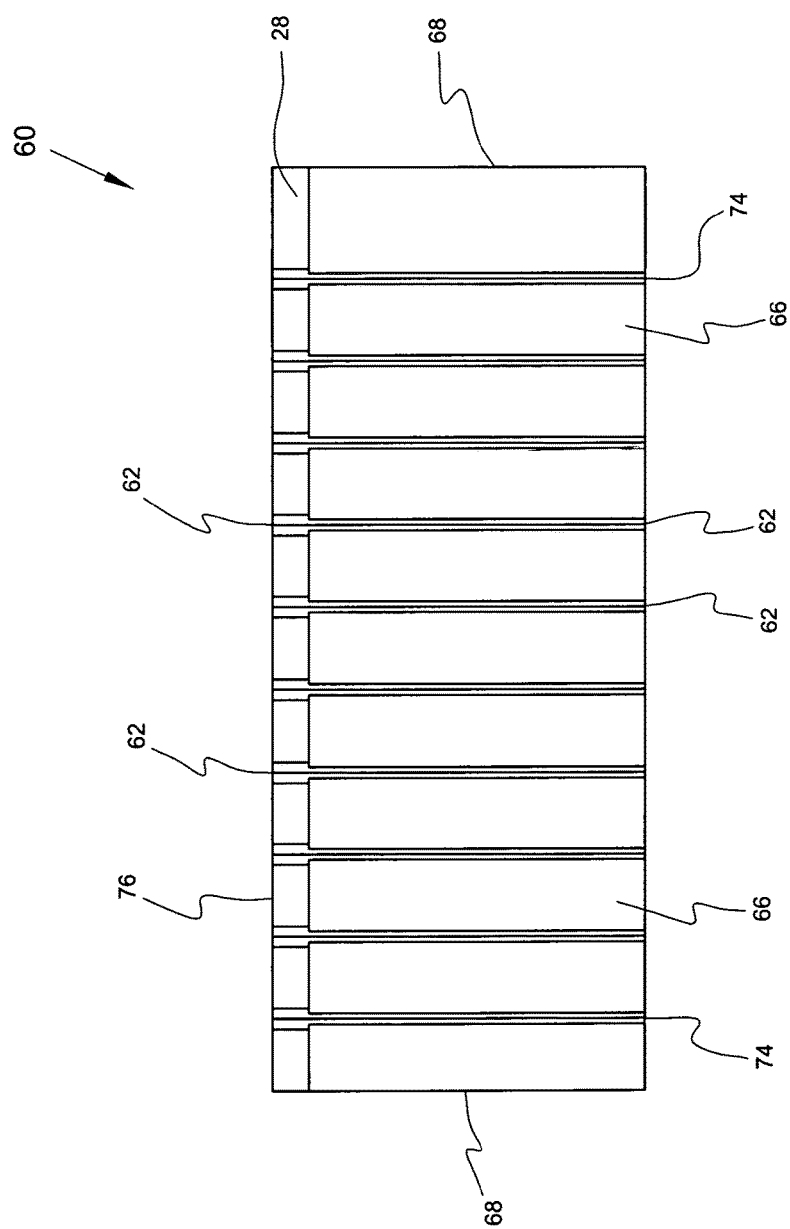
FIG. 9 is a side elevation view of the building block of FIG. 8.
Figure 10:
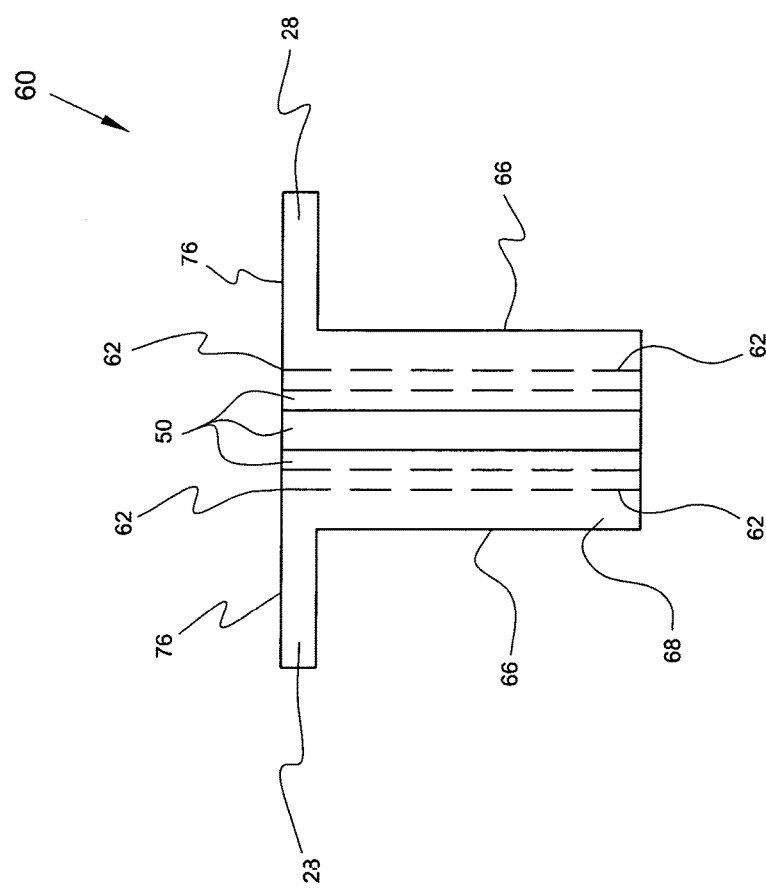
FIG. 10 is an end elevation phantom view of the building block of FIG. 8 without a deformable material disposed thereupon.
Figure 11:
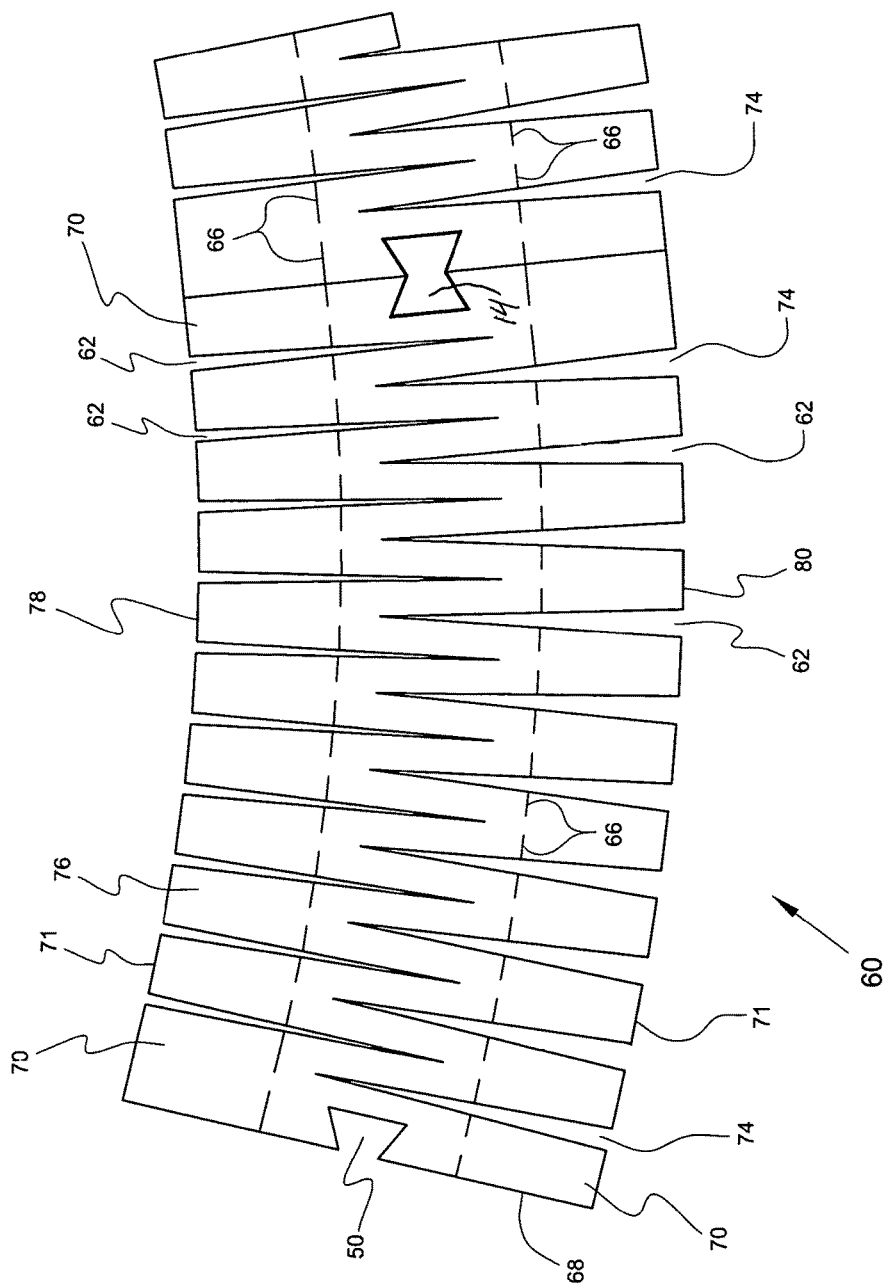
FIG. 11 is the top elevation view of the building block of FIG. 8, but with a top elevation view of a second building block secured to the building block of FIG. 8 with both blocks disposed in an arcuate or bent configuration in accordance with the present invention.
Figure 12:
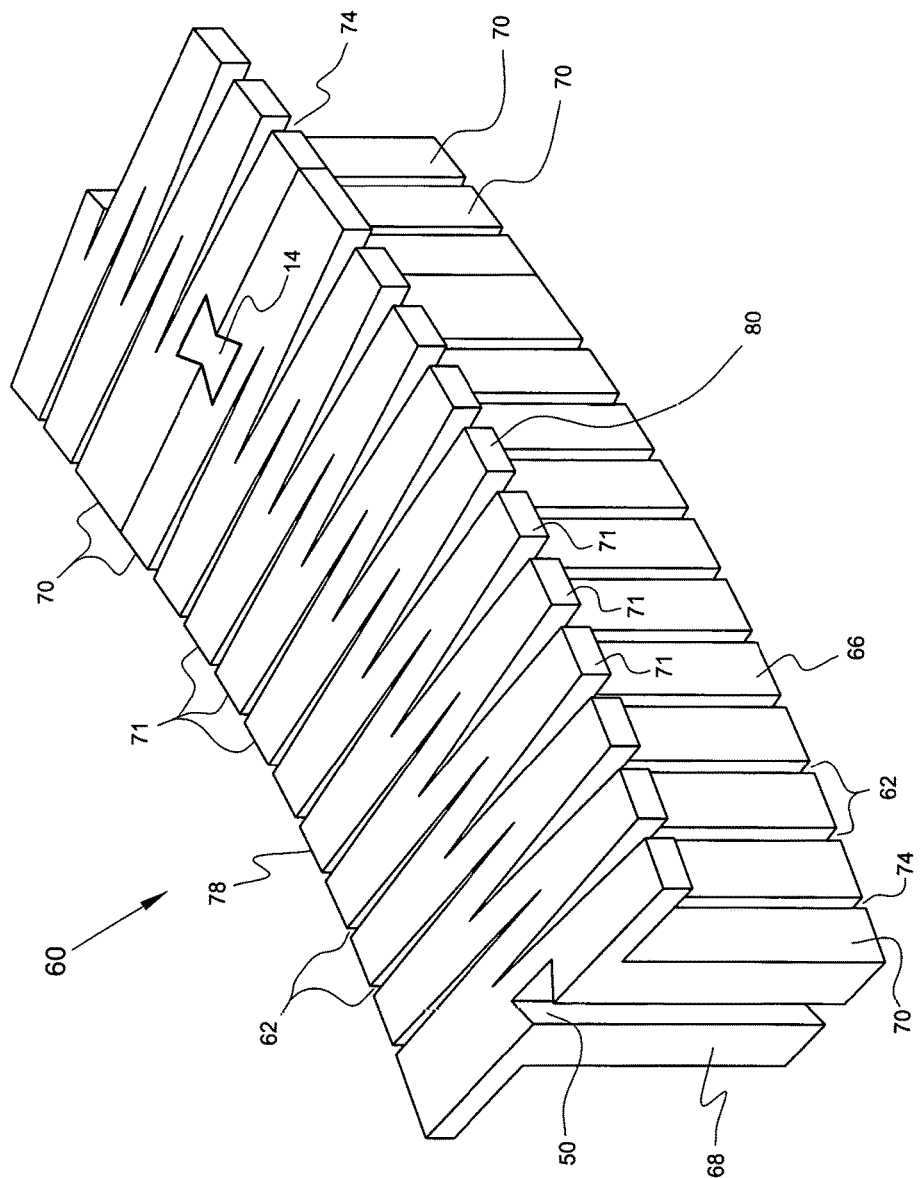
FIG. 12 is a perspective view of the configuration blocks of FIG. 11.

Referring now to FIGS. 8-13, an alternative building block for configuring deformable material to provide a predetermined relatively non-deformable visual display in accordance with the present invention is denoted by numeral 60. The block 60 is substantially the same as the block 12 depicted in FIGS. 1-7 with the exception of the removal of the ridge portions 20 and with the gaps or apertures 62 of the block 60 having a triangular configuration instead of a rectangular configuration 16 in accordance with the present invention. FIG. 8A depicts the same top view of the building block 60 as is depicted in FIG. 8, but with the addition of gap or aperture plugs 64 inserted in the gaps 62. The plugs 64 are retained in the gaps 62 via tape, wire or similar retaining means (not depicted) snugly wrapped about the side and end walls 66 and 68 of the building block 60.

Figure 1:
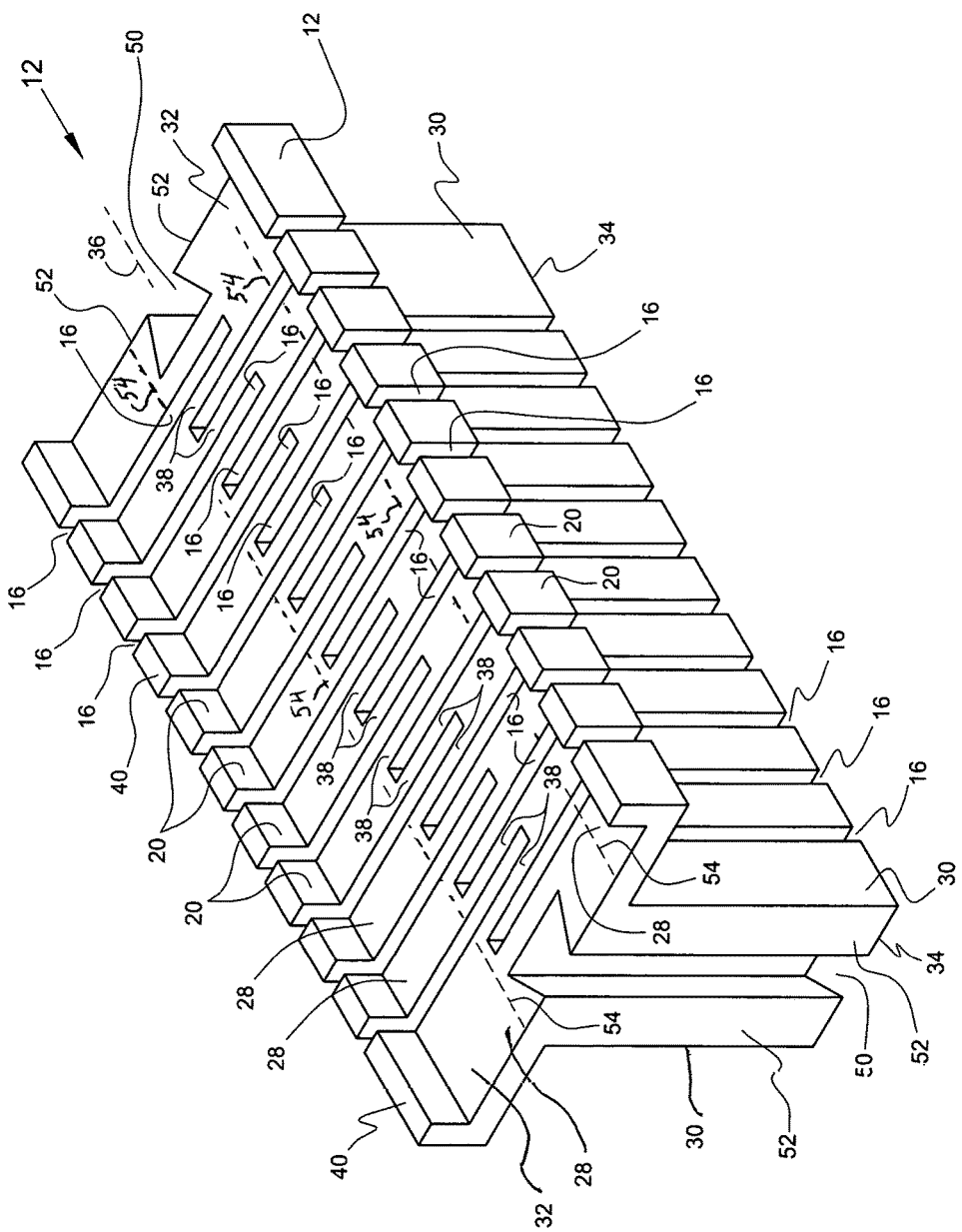
FIG. 1 is a perspective view of a device building block for configuring deformable material to provide a predetermined relatively non-deformable visual display in accordance with the present invention.

A continuous ridge 69 (FIG. 13) is ultimately glued or otherwise secured to longitudinal edge portions 71 of a top wall 76 of the block 60 after the block 60 has been positioned but before the deformable material is disposed upon the block 60. The placement of the ridge 69 upon the block 60 after the block has been positioned to form the visual display minimizes damage to the ridge 69 during shipment of the block 60. Further, when the blocks are arcuately disposed, securing the ridge 69 upon the blocks 60 after placement of the blocks provides a continuous retaining wall for the deformable material that is ultimately disposed upon the top wall 76, thereby eliminating openings that would otherwise occur if a segmented ridge portion 20 were to be used as depicted in FIG. 1. To prevent the ridge 69 from being damaged after being secured to the top wall 76 of the block 60, a relatively thin, flexible and substantially rigid strip of plastic or similar material is longitudinally aligned and continuously secured via glue to a top wall 82 of the strip 69.

When the blocks 60 are longitudinally aligned such that end walls 68 are congruently engaged and retained together by a key member 14 inserted into cooperating recesses 50, plugs 64 are inserted into all gaps 62 and cooperate with the ridge 69 to maintain a deformable material such as concrete upon the top wall 76 of the block 60 to allow the concrete to harden to ultimately form part of a predetermined visual display. When the blocks 60 are arcuately or circumferentially aligned (see FIGS. 11 and 12) such that a curve is formed for the predetermined visual display, a compressed side 78 having only gaps 62 is formed together with an expanded side 80 having all gaps 62 filled with plugs 64. The removal of the plugs 64 on the compressed side 78 while maintaining the plugs 64 on the expanded side 80 promotes the arcuate or curved configuration of the block 60 without damage to the block 60; and promotes the retention of the deformable material upon the top wall 76 of the block 60 by preventing the deformable material from draining through expanded gaps 62, which are now plugged. The triangle configured recesses 62 and plugs 64 will provide sufficient flexibility for the blocks 60 when the blocks 60 form arcs or bends having a relatively large radius.

Figure 2:
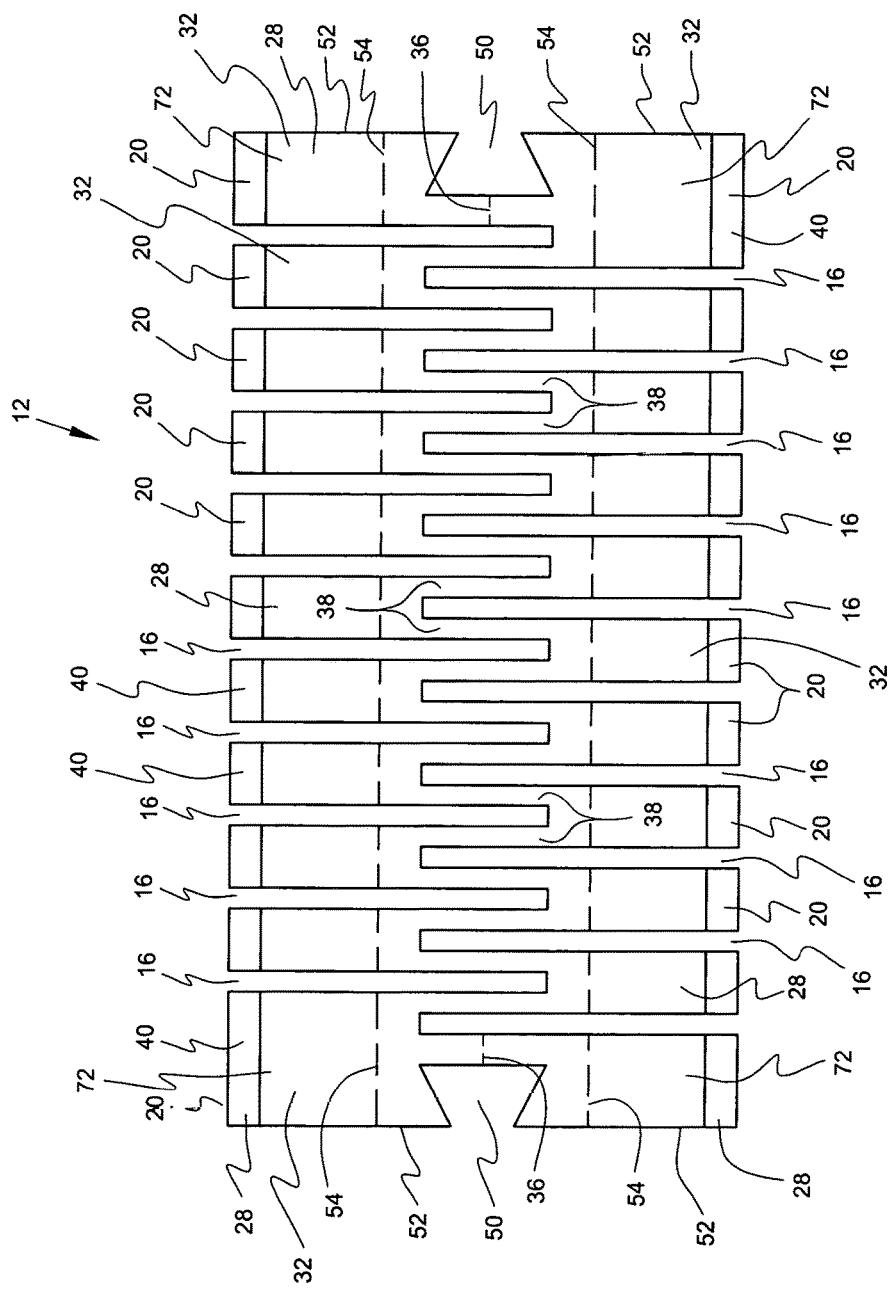
FIG. 2 is a top elevation view of the building block of FIG. 1 with the top wall in a substantially horizontal plane.
Figure 3:
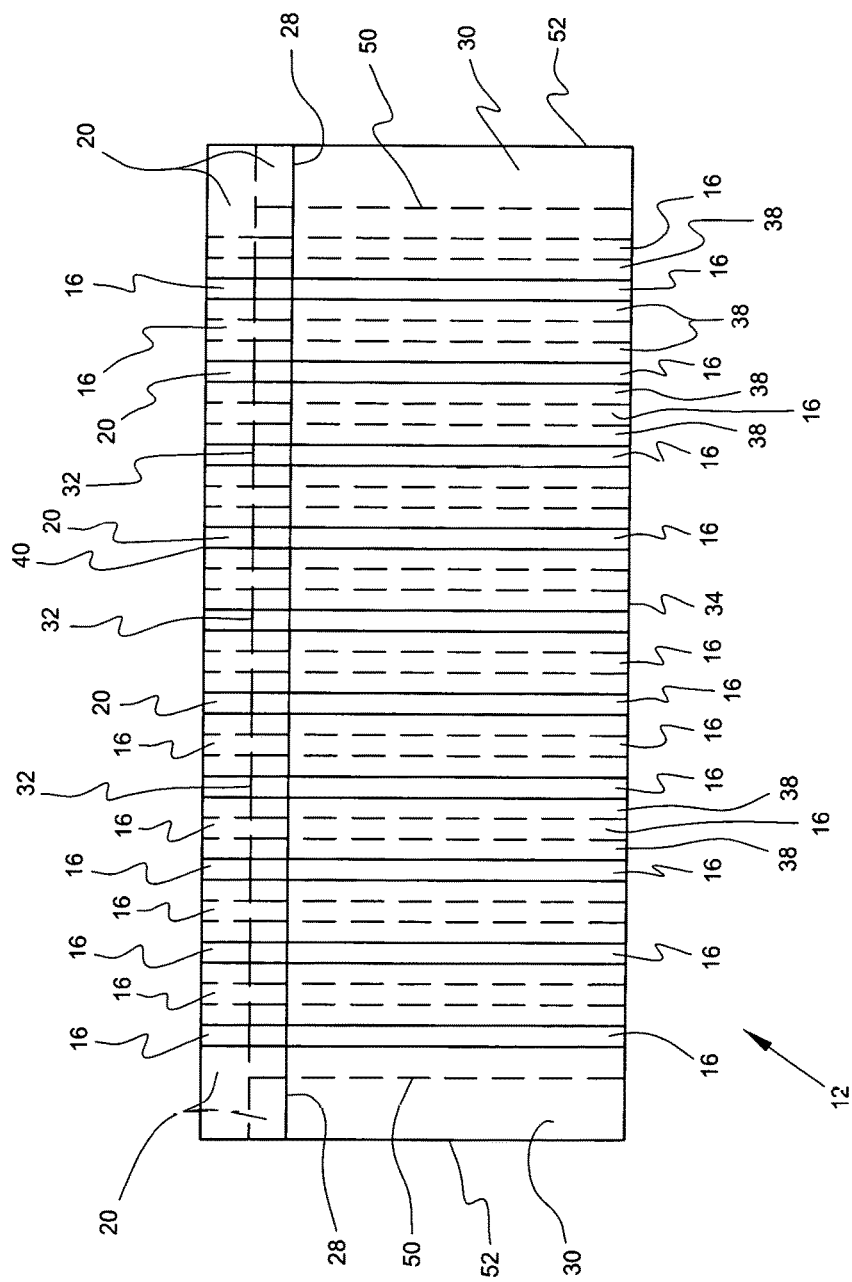
FIG. 3 is a side elevation phantom view of the building block of FIG. 1.

To increase the bending capability of the block 60 when a relatively smaller bending radius is required, the lateral dimensions of end portions 70 of the building block 60 depicted in FIG. 8 has been reduced relative to the lateral dimensions of end portions 72 of the building block 12 in FIG. 2. More specifically, the lateral dimensions extending from end walls 68 to first gaps 74 of block 60 have been reduced relative to corresponding dimensions of the building block 12 to generate more flexibility at the end portions 70 of two longitudinally disposed adjacent blocks 60 (FIG. 11) to promote a more constant or uniform curve between two adjacently disposed blocks 60 when constructing a visual display having arcuate or circular portions.

Figure 13:
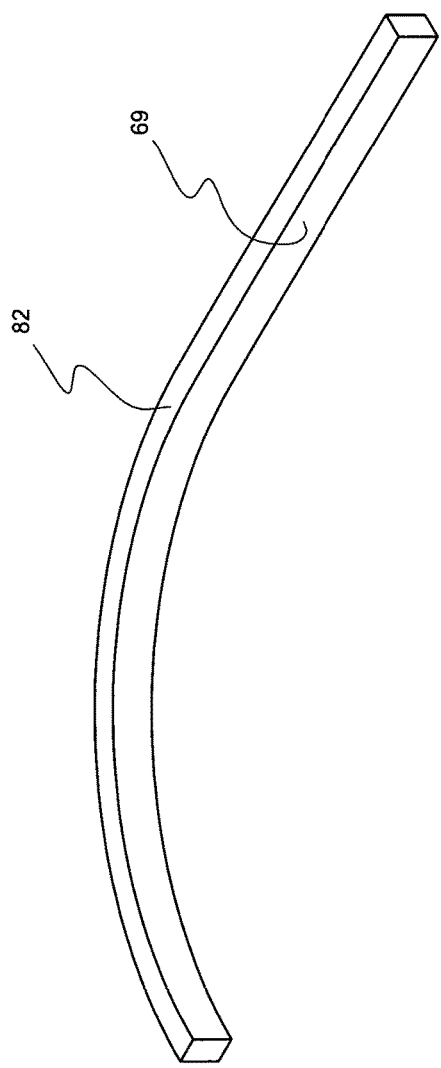
FIG. 13 is a perspective view of a ridge portion that attaches to longitudinal edges of a top wall of the building block.
Figure 14:
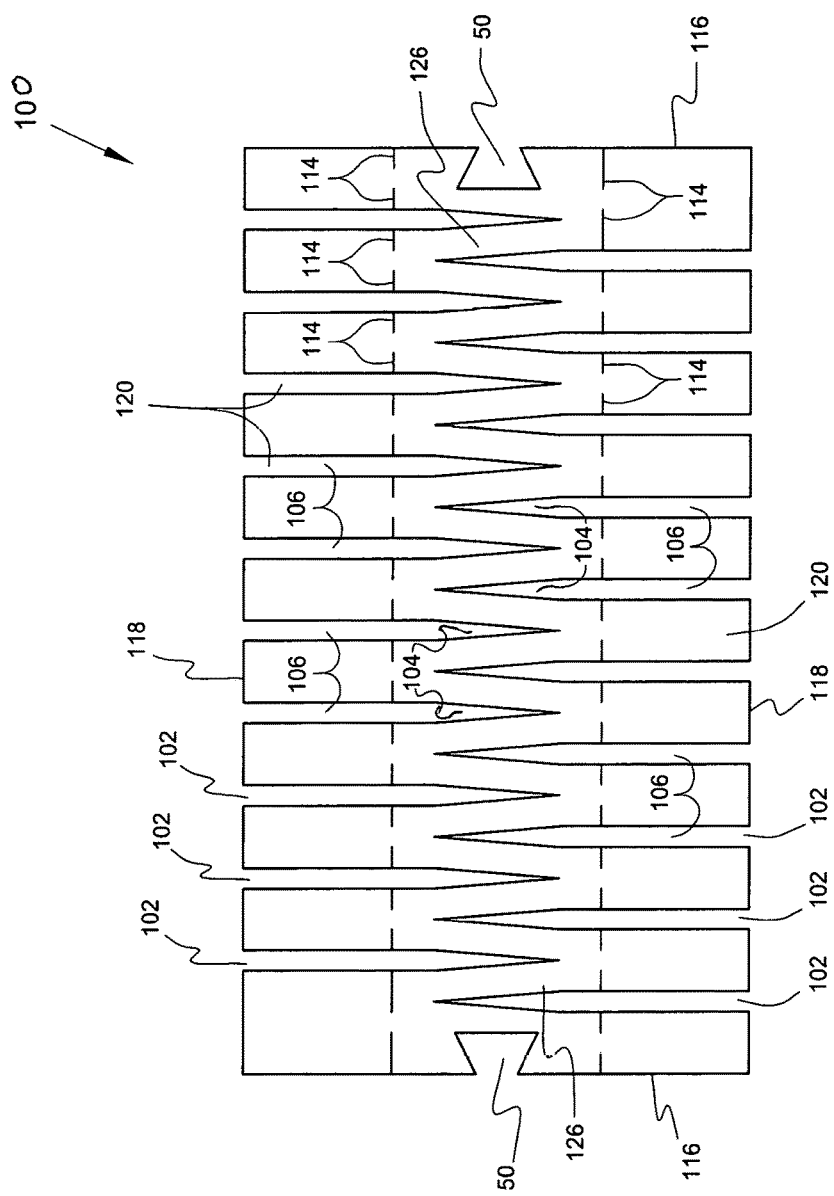
FIG. 14 is a top elevation view of the building block of FIG. 8, but with the gaps or apertures having both triangular and rectangular configured portions in accordance with the present invention.
Figure 14A:
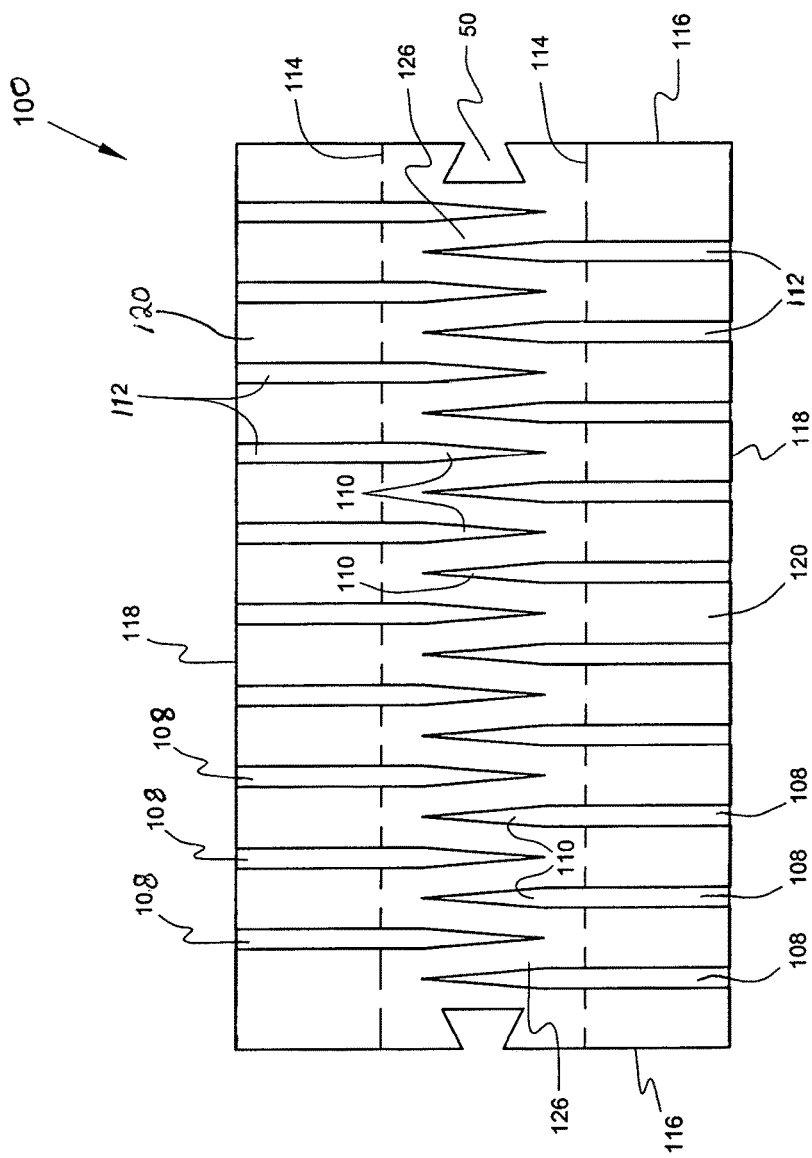
FIG. 14A is the top elevation view of FIG. 14, but with an aperture plug disposed in each aperture in accordance with the present invention.
Figure 15:
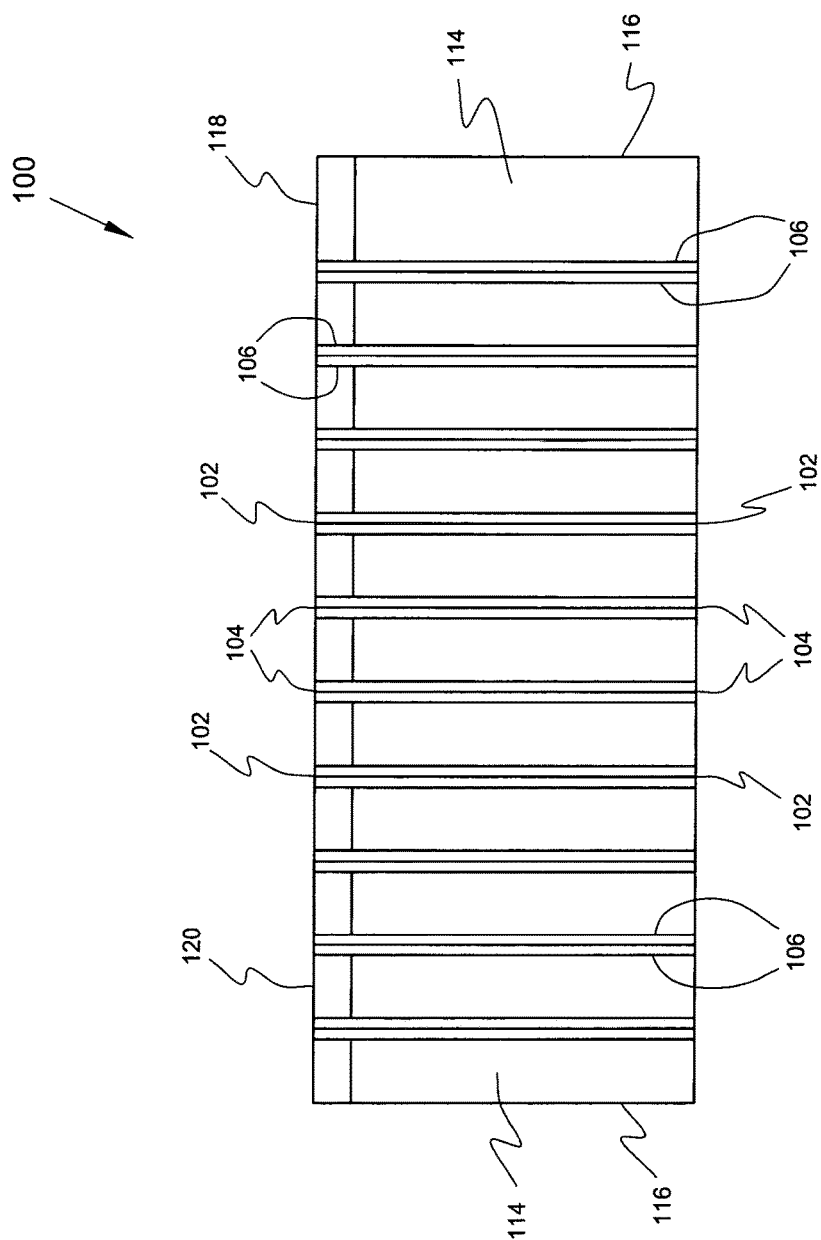
FIG. 15 is a side elevation view of the building block of FIG. 14.
Figure 16:
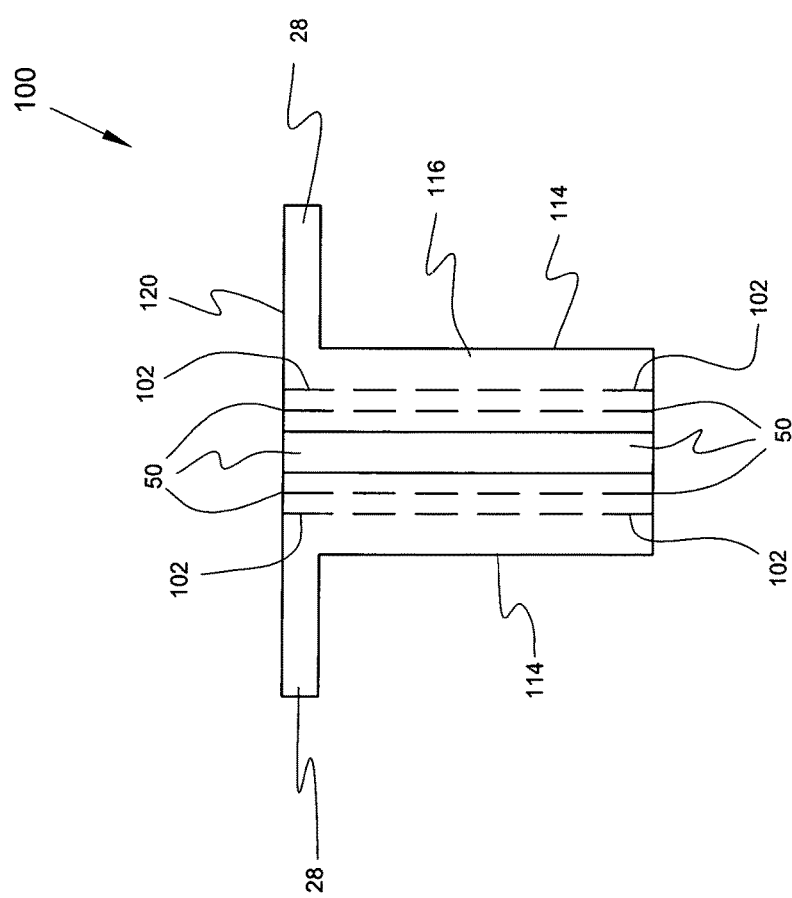
FIG. 16 is an end elevation phantom view of the building block of FIG. 14 without a deformable material disposed thereupon.
Figure 17:
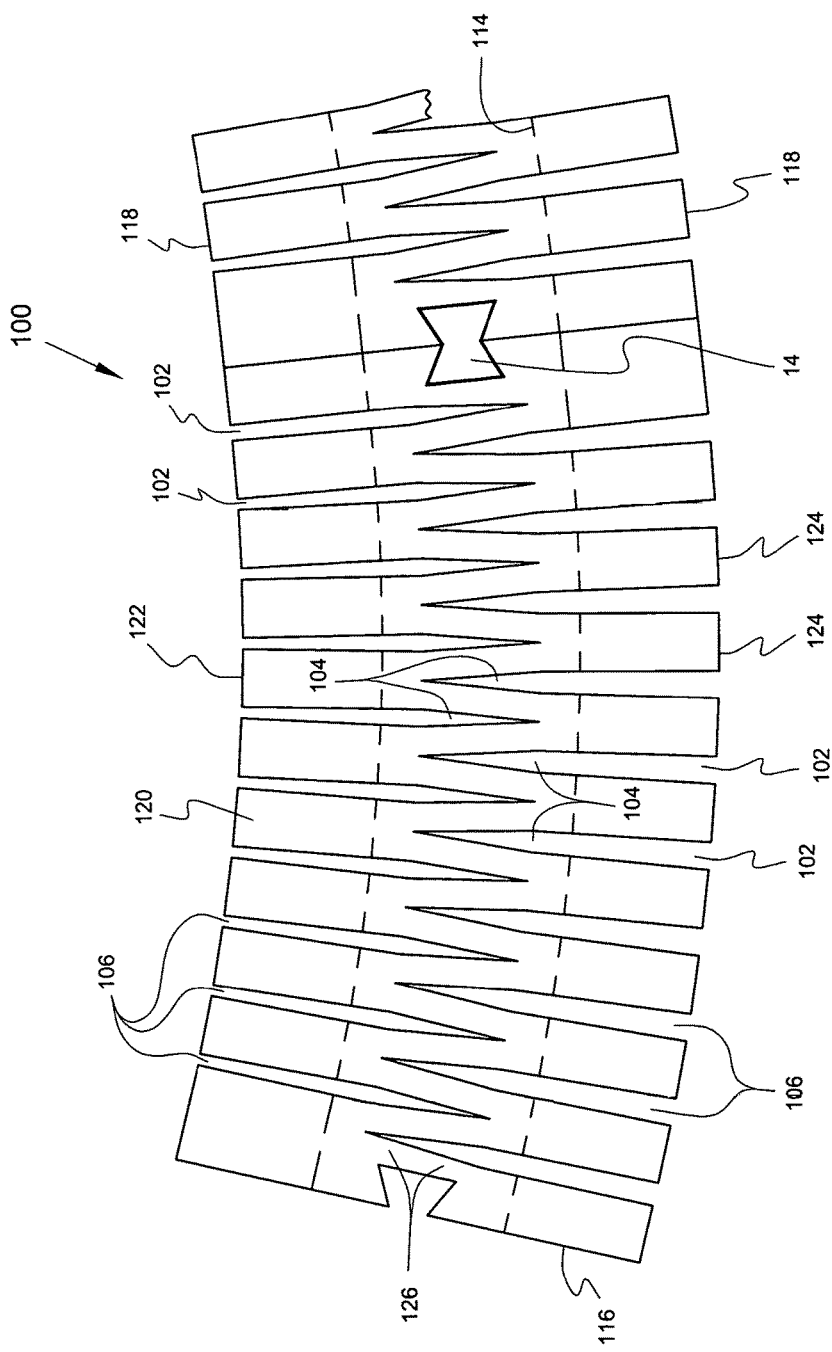
FIG. 17 is the top elevation view of the building block of FIG. 14, but with a top elevation view of a second building block secured to the building block of FIG. 14 with both blocks disposed in an arcuate or bent configuration in accordance with the present invention.
Figure 18:
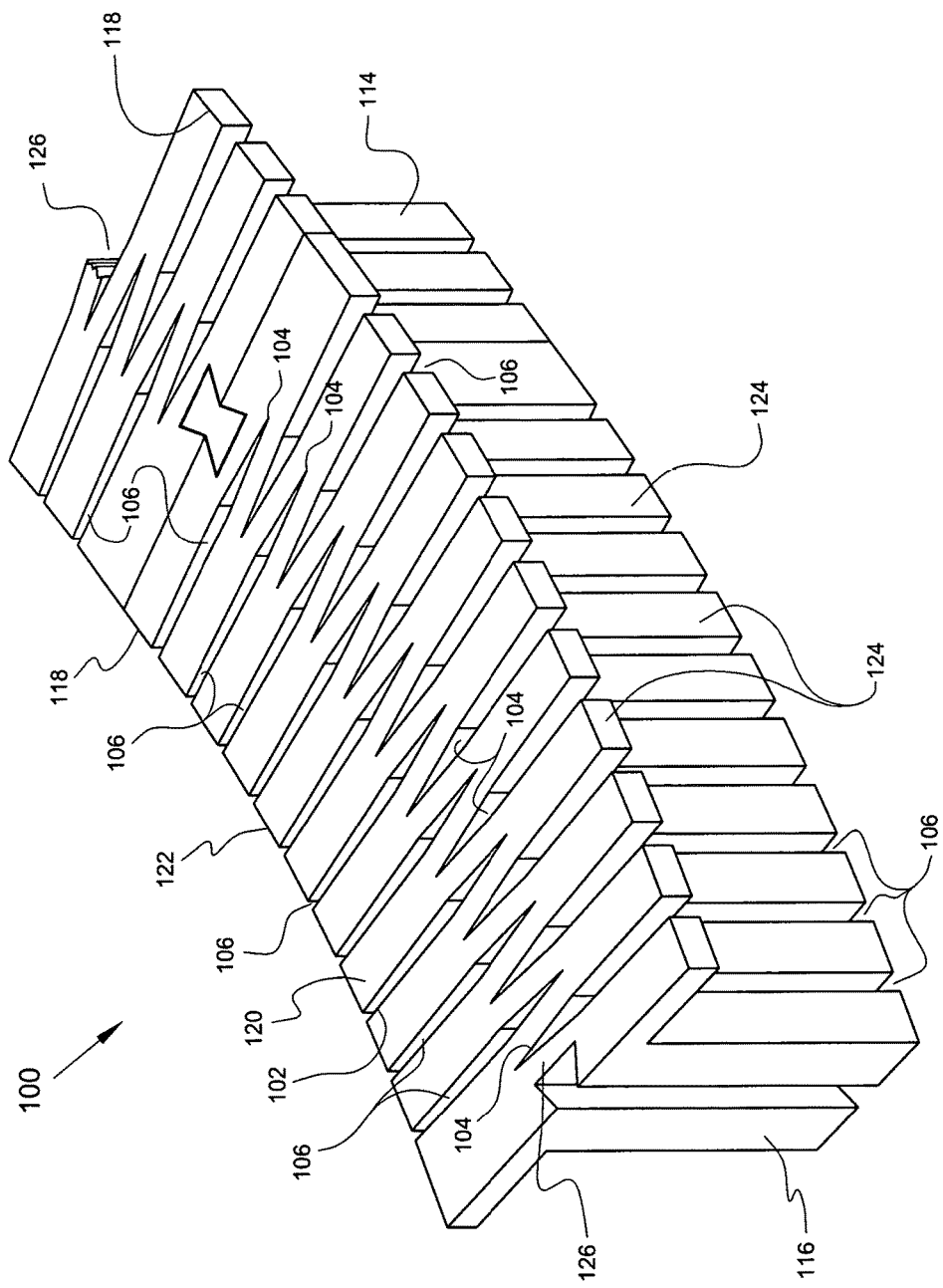
FIG. 18 is a perspective view of the configuration blocks of FIG. 17.

Referring now to FIGS. 14-18, to further increase the bending capability of the block 60 when a relatively smaller bending radius is required, another alternative building block for configuring deformable material to provide a predetermined relatively non-deformable visual display in accordance with the present invention is denoted by numeral 100. The block 100 is substantially the same as the block 60 depicted in FIGS. 8-13 with the exception of the gaps or apertures 102 of the block 100 having a triangular configuration for an inner portion 104 and a rectangular configuration for an outer portion 106 in accordance with the present invention. FIG. 14A depicts the same top view of the building block 100 as is depicted in FIG. 14, but with the addition of gap or aperture plugs 108 inserted in the gaps 102 and cooperatively configured substantially similar such that the plugs 108 include an inner portion 110 and outer portion 112. The plugs 108 are retained in the gaps 102 via tape, wire or similar retaining means (not depicted) snugly wrapped about the side and end walls 114 and 116 of the building block 100.

When the blocks 100 are longitudinally aligned such that end walls 116 are congruently engaged and retained together by a key member 14 inserted into cooperating recesses 50, plugs 108 are inserted into all gaps 102 and cooperate with the ridge 69 to maintain a deformable material such as concrete upon the top wall 120 of the block 60 to allow the concrete to harden to ultimately form part of a predetermined visual display. When the blocks 100 are arcuately or circumferentially aligned (see FIGS. 17 and 18) with a relatively small radius of bend to form a "tight" curve for a predetermined visual display, a compressed side 122 having only gaps 102 is formed together with an expanded side 124 having all gaps 102 filled with plugs 108. The removal of the plugs 108 on the compressed side 122 while maintaining the plugs 108 on the expanded side 124 promotes the relatively tight or small radius arcuate or curved configuration of the block 100 without damage to the block 100; and promotes the retention of the deformable material upon the top wall 120 of the block 100 by preventing the deformable material from draining through expanded gaps 102, which are now plugged.

The combined gaps 102 and plugs 108 with their cooperating rectangular configured outer portions (106 and 112) provide sufficient flexibility for the blocks 100 by increasing the gap 102 "volume" adjacent to the side walls 114 to promote the bending of the blocks 100 to form arcs or bends having a relatively small radius when compared to bends of blocks that include only triangular configured gaps and plugs (62 and 64). Further, the combined gaps 102 and plugs 108 with their cooperating triangular configured inner portions (104 and 110) provide sufficient gap volume reduction adjacent to a mid-portion 126 of the block 100 to prevent a deformable material disposed upon the top wall 120 of the block 100 from leaking through the top wall 120 and into the gaps 102. The combined triangular-rectangular configuration for the gaps 102 and plugs 108 optimizes the performance of the block 100 such that only one block design is required to achieve a myriad of visual displays, thereby reducing the cost of materials to build the display and the time required to construct the display.

The same continuous ridge 69 of FIG. 13 is ultimately glued or otherwise secured to longitudinal edge portions 118 of a top wall 120 of the block 100 after the block 100 has been positioned but before the deformable material is disposed upon the block 100.

The foregoing description is for purpose of illustration only and is not intended to limit the scope of protection accorded this invention. The scope of protection is to be measured by the following claims, which should be interpreted as broadly as the inventive contribution permits.

The invention claimed is:

1. A device for configuring deformable material to provide a predetermined relatively non-deformable visual display comprising:
   a plurality of configuration blocks for receiving deformable material that ultimately transforms to a relatively non-deformable material;

means for aligning and securing together adjacently disposed configuration blocks;

means for arcuately disposing said configuration blocks;

means for configuring an edge portion of said deformable material;

means for removing first predetermined portions of said configuration blocks; and means for vertically securing said deformable material to second predetermined portions of said configuration blocks, whereupon, predetermined designs are permanently imprinted upon said first and second predetermine portions, resulting in a relatively rigid predetermined visual display.

2. The device of claim 1 wherein said configuration blocks are fabricated from Polystyrene.

3. The device of claim 1 wherein said configuration blocks are fabricated from Polyurethane.

4. The device of claim 1 wherein said configuration blocks are fabricated from plastic.

5. The device of claim 1 wherein said configuration blocks are fabricated from metal.

6. The device of claim 1 wherein said configuration blocks are fabricated from stone.

7. The device of claim 1 wherein said deformable material includes concrete.

8. The device of claim 1 wherein said deformable material includes plaster.

9. The device of claim 1 wherein said deformable material includes metal.

10. The device of claim 1 wherein said deformable material includes baking material.

11. The device of claim 1 wherein a configuration block includes a relatively "T" configuration when taking an end view of said configuration block.

12. The device of claim 1 wherein said configuration block includes a plurality of gaps extending into opposing side walls of said configuration block.

13. The device of claim 12 wherein said gaps vertically extend into said opposing side walls.

14. The device of claim 13 wherein said gaps extend from a top wall of said configuration block to a bottom wall of said configuration block.

15. The device of claim 14 wherein said gaps extend from a side wall of said configuration block to a position past a longitudinal mid-line of said configuration block, thereby cooperating with adjacent gaps extending from an opposing side wall of said configuration block to form configuration fingers that allow said configuration block to be arcuately configured.

16. The device of claim 12 wherein said gaps are rectangularly configured when taking a top elevation view of said configuration block.

17. The device of claim 12 wherein said gaps are trapezoid configured when taking a top elevation view of said configuration block.

18. The device of claim 12 wherein said gaps are triangle configured when taking a top elevation view of said configuration block.

19. The device of claim 15 wherein said configuration fingers are rectangularly configured when taking a top elevation view of said configuration block.

20. The device of claim 15 wherein said configuration fingers are trapezoid configured when taking a top elevation view of said configuration block.

21. The device of claim 15 wherein said configuration fingers are triangle configured when taking a top elevation view of said configuration block.

22. The device of claim 12 wherein said gaps include a lateral dimension of substantially about one inch.

23. The device of claim 1 wherein said configuration block includes a longitudinal dimension of substantially about forty-eight inches.

24. The device of claim 1 wherein said configuration block includes a height dimension of substantially about twenty inches.

25. The device of claim 1 wherein said configuration block includes a lateral dimension of substantially about ten inches.

26. The device of claim 12 wherein said gaps are rectangularly configured when taking a front elevation view of said configuration block.

27. The device of claim 12 wherein said gaps are trapezoid configured when taking a front elevation view of said configuration block.

28. The device of claim 12 wherein said gaps are triangle configured when taking a front elevation view of said configuration block.

29. The device of claim 15 wherein said configuration fingers are rectangularly configured when taking a front elevation view of said configuration block.

30. The device of claim 15 wherein said configuration fingers are trapezoid configured when taking a front elevation view of said configuration block.

31. The device of claim 15 wherein said configuration fingers are triangle configured when taking a front elevation view of said configuration block.

32. The device of claim 1 wherein said aligning and securing means includes a securing key member having a configuration, when taking a top elevation view of the device, comprised of two trapezoidal members integrally joined via relatively shorter leg portions such that relatively longer and parallel leg portions are oppositely disposed to promote the snug engagement of said securing key member with cooperatively configured recesses in adjacently disposed configuration blocks, resulting in congruent and maintained engagement of corresponding ends walls of said adjacently disposed configuration blocks to promote a predetermined configuration of a plurality of said configuration blocks.

33. The device of claim 1 wherein said means for configuring an edge portion of said deformable material includes a ridge portion integrally joined to a top wall of each configuration member.

34. The device of claim 33 wherein said means for configuring and edge portion of said deformable material includes an insert member engaging an inner wall of said ridge portion, said insert member includes an inner wall having a predetermined configuration that ultimately engages a side portion of said deformable material, said insert member ultimately being removed after said deformable material has transformed to a relatively non-deformable material.

35. The device of claim 1 wherein said means for removing first predetermined portions of said configuration blocks includes removable arm members integrally joined to a base member of each configuration block.

36. The device of claim 35 wherein said removable arm members includes perforations that promote the manual removal of said arm members from said base member.

37. The device of claim 1 wherein said means for vertically securing said deformable material to second predetermined portions of said configuration blocks includes securing said deformable material to portions of a base member of each of said plurality of configuration blocks, whereupon, predetermined designs are permanently imprinted upon said portions of said base member, resulting in a relatively rigid predetermined visual display.

38. The device of claim 33 wherein said top wall of each of said configuration blocks is substantially horizontally orientated.

39. The device of claim 33 wherein said top wall of each of said configuration blocks is substantially vertically orientated.

40. The device of claim 33 wherein said top wall of each of said configuration blocks can vary from horizontal to vertical, and at any angle between horizontal and vertical.

41. The device of claim 12 wherein said gaps are filled with deformable material.

42. The device of claim 12 wherein means are employed to prevent said gaps from receiving deformable material.

43. The device of claim 42 wherein tape is employed to prevent said gaps from receiving deformable material.

44. The device of claim 35 wherein gaps between adjacent arm members are prevented from receiving deformable material.

\* \* \* \* \*